United States Patent [19]

Lamy et al.

[11] Patent Number: 5,304,421
[45] Date of Patent: Apr. 19, 1994

[54] SYNTHETIC RESIN SPECTACLE FRAME COMPONENT, AND METHOD OF MANUFACTURING IT

[75] Inventors: Marc Lamy, Morbier; Jean-Philippe Caspar, Les Rousses, both of France

[73] Assignee: L'Amy S.A., Morez, France

[21] Appl. No.: 845,968

[22] Filed: Mar. 4, 1992

[30] Foreign Application Priority Data

Mar. 6, 1991 [FR] France .................... 91 02882

[51] Int. Cl.⁵ .............................. D02G 3/00
[52] U.S. Cl. ...................... 428/377; 428/36.3; 428/34.1; 428/378; 351/41; 351/111; 351/112
[58] Field of Search ............ 351/41, 111, 112, 113, 351/123, 120; 428/36.3, 34.1, 36.9, 398, 378, 377

[56] References Cited

U.S. PATENT DOCUMENTS

| | | | |
|---|---|---|---|
| 2,999,826 | 9/1961 | Peerman | 528/122 |
| 3,708,567 | 1/1973 | Hampel | 528/122 |
| 4,343,843 | 8/1982 | Johnson et al. | 428/36.3 |
| 4,666,265 | 5/1987 | Takeda | 351/41 |
| 4,902,537 | 2/1990 | Yamada et al. | 428/413 |

FOREIGN PATENT DOCUMENTS

| | | |
|---|---|---|
| 0301631 | 2/1989 | European Pat. Off. . |
| 2594345 | 8/1987 | France . |
| 2628538 | 9/1989 | France . |
| 49-6820 | 1/1974 | Japan . |
| 51-40945 | 4/1976 | Japan . |
| 60-95422 | 5/1985 | Japan . |

OTHER PUBLICATIONS

World Patents Index Latest, Section PQ, Week 8527, Derwent Publications Ltd., London, GB; Class P81, AN 85-163348 and JP 60095422.

Manufacturing Technology International, 1990, London, GB, pp. 111–116, "Prepeg braid and its uses", by D. J. B. Sainsbury-Carter.

World Patents Index, Section Ch, Week 7621, Derwent Publications Ltd., London, GB; Class A, An 76-38781X and JP-A-51,040,945.

World Patents Index, Section CH, Week 7410, Derwent Publications Ltd., GB; Class A, AN 74-18556V and JP-A49,006,820.

*Primary Examiner*—Patrick J. Ryan
*Assistant Examiner*—N. Edwards
*Attorney, Agent, or Firm*—Sandler Greenblum & Bernstein

[57] ABSTRACT

A spectacle frame component of fibre-reinforced synthetic resin comprising only a single peripheral tubular braid woven from threads made up of a number of long parallel carbon monofilaments, similar to taffeta, at an angle between 15° and 45° to the longitudinal axis of the component.

20 Claims, 1 Drawing Sheet

SYNTHETIC RESIN SPECTACLE FRAME COMPONENT, AND METHOD OF MANUFACTURING IT

FIELD OF THE INVENTION

The invention relates to a spectacle frame component made of fiber-reinforced synthetic resin, more particularly a rim holding the lens or optionally a part of a spectacle frame.

DESCRIPTION OF RELATED ART

Some known plastic spectacles are made by injecting or machining cellulose acetate, which has a number of colors. The advantage of plastic is its lightness (density = 1.26), but its mechanical strength is low. Since the spectacle frame is made of a single material, the places where it is under stress have to be reinforced to prevent breakage. The only solution is to increase the cross-section, which may spoil the appearance and increase the weight of the frame.

Other known spectacle frames are metal based on copper or cupro-nickel, the various components of the frame being manufactured in an alloy and in a work-hardened state corresponding to the desired mechanical strength and to aesthetic criteria. Furthermore, since a number of components can be used in combination, frames of varying size and appearance can be manufactured with a minimum of equipment. The mechanical strength of these frames is very high. On the other hand, since the materials are denser (density = 8 to 9), these frames are heavier. A recent development relates to titanium spectacle frames, which are less dense and have advantageous mechanical characteristics. On the other hand, this development is limited by the difficulty of processing, assembly and final electroplating.

Another development has consisted in combining the plastics with reinforcing fibers, initially short, then longer and optionally braided, resulting in a family of "composite" frames. FR 2 628 538 gives a description in very general terms of a composite structure of use for spectacle frames and comprising a core in the form of a unidirectional network of threads surrounded by a number of layers, i.e. intermediate matrix, first matrix, preparatory layer, and second matrix. The preparatory layer can be a textile product made of long fibers of carbon, glass, aramid, vegetable material or synthetic material. The matrix is of thermoplastic material, so that it can be shaped after heating. A sheath of vegetable material, e.g., cotton, can be used e.g., to hold the fibers, since they may be dangerous if the component breaks.

JP-A-60 095 422 discloses a method of manufacturing spectacle frame components made up of parallel threads of carbon or glass or synthetic material or organic or inorganic material embedded in a matrix, which, is a type A bisphenol epoxy containing a diamine diphenyl methane hardening agent. The parallel fibers are first impregnated with resin at a proportion of between 40 and 50% by volume, and are then initially dried at low temperature before being disposed in a mould in order to give them their final shape by baking at high temperature under pressure.

However, these composite materials comprising multiple concentric layers or a core of embedded parallel threads have mechanical properties that are far below the requirements i.e., when the cross-sections are of the order of a few square millimeters.

SUMMARY OF THE INVENTION

The object of the invention is to construct a spectacle frame component of fiber-reinforced synthetic resin that has a specific gravity below 2 and considerable mechanical strength at cross-sections of the order of 1 to 4 millimeters square. More particularly, a rim constructed according to the invention must have resistance to transverse torsion and bending stresses which is more than enough for permanently holding a corrective lens in the right position on the face. The material of which the component is made must always be inert towards the wearer's skin and must not be brittle or have sharp angles in the event of impact. It must also be possible, without special difficulty, to fit the components together to form the final frame.

These aims have been achieved, after numerous theoretical studies, computer simulations and workshop tests, by a spectacle frame component comprising only a single peripheral tubular braid woven from long reinforcing fibers. Particularly advantageously, the tubular braid is woven from a number of threads, each made up of a number (e.g. 3000) of long parallel carbon monofilaments. Advantageously also, the tubular braid is a taffeta-like woven structure of four to eight threads at an angle between 15° and 45° to the longitudinal axis of the component. The diameter of the braid can be between 1 and 5 millimeters, in which case its thickness will be between 0.1 and 0.5 millimeters.

According to the invention, the polymeric resin can be impregnated either throughout the spectacle frame component or only in the tubular braid. This is the essential component for obtaining the desired remarkable mechanical properties, relative to the small cross-section and the lightness of the component. In all cases the proportion of impregnated resin by volume will be between 45 and 55% preferably between 40 and 50%.

When the synthetic resin is a type A bisphenol epoxy, it has been found advantageous to add 0.1 to 0.8% by volume of a first aliphatic amine hardening agent and 3 to 50% by volume of a second aromatic diamine hardening agent, or 30 to 50% by volume of a single hardening agent, e.g., a cyclo-aliphatic diamine.

In that case one or more additional components can be attached to the frame component, either by insertion into the component when still flexible, or by sticking with an epoxy adhesive or by molding an additional plastic component on to the component after it has hardened. Alternatively, for aesthetic reasons, the tubular braid can be woven from differently-colored threads or monofilaments.

A method of manufacturing a spectacle frame component may comprise:

filling the core of the tubular braid of the component with an inert filling material such as a polyurethane foam or polyester threads, after which the tubular braid is externally impregnated with resin, shaping the cross-section of the component and stabilizing it by starting the first hardening agent at a temperature below 100° C., and shaping the component in three dimensions and finally hardening it by starting the second hardening agent at a temperature above 160° C. If desired, the filling material can then be removed from the core of the component, since even if it remains in position it contributes nothing to the mechanical properties of the component.

The invention will be more clearly understood from an embodiment applied to a rim, given by way of non-limitative example and described in the accompanying drawings in which:

DESCRIPTION OF THE PREFERRED EMBODIMENTS

Figure 1:
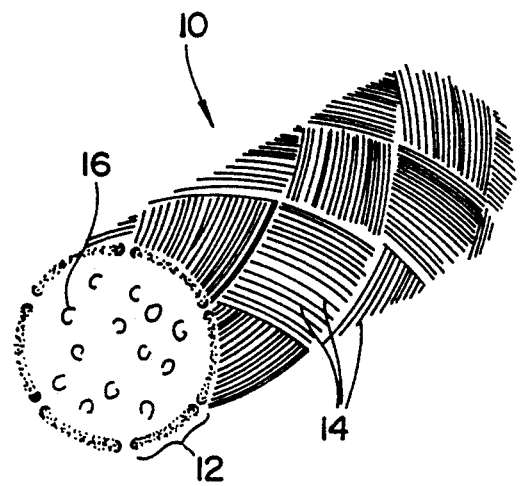
FIG. 1 is a perspective view of an initial part of a braid.

FIG. 1 shows part of a braid 10 in the form of a tube made up of six threads 12. Each thread in turn is made up of about 3000 high-modulus carbon monofilaments 14 disposed parallel to one another. When unfolded, it can be seen that the weaving stitch used is the taffeta stitch, i.e. the threads 12, have a flattened or strip shape. The fabric is said to be balanced, i.e., the number of warp threads equals the number of weft threads. Also the fabric is compact, i.e., there is no visible gap between the stitches. The angle between the warp and the weft is between 15° and 45°, preferably 30°. The thickness of the tube is defined by superposition of a warp thread and a weft thread at the place where they intersect.

The average diameter of the filaments 14 making up a thread 12 is 5 to 8 microns. Numerous materials such as glass, Aramid or Keviar can be used for the filaments, but it has been found that carbon fibers provide a particularly advantageous compromise between the desired dimensions and the desired strength of the end product. As shown, the optimum thickness of the braid 10 has been fixed at 0.1 to 0.5 millimeters for an outer diameter of 1 to 4 millimeters.

Figure 2:
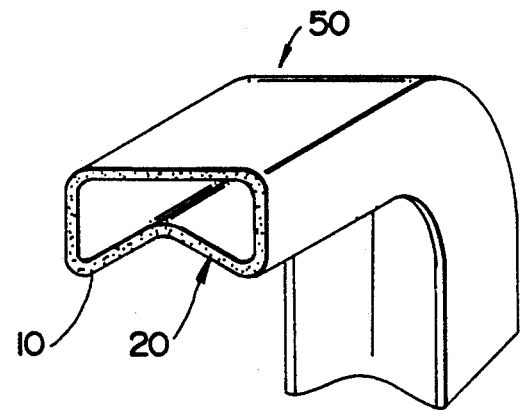
FIG. 2 is a perspective view of part of a rim manufactured according to the invention.

FIG. 2 shows a part of a spectacle frame component 50 made from a braid 10 by impregnation of epoxy resin 20 which is subsequently hardened. To obtain the intended results, it has been found that the proportion of filaments by volume should be greater than 50%, since the strength is proportional to the percentage of filaments, but should not exceed 60%, to avoid the risk of brittle section members. To this end, the surplus resin is removed after impregnation, with the result that the aforementioned proportion is kept as a result of the special shape of the braid 10. In this configuration, the resin is disposed in the gaps between the filaments and at the weaving stitches.

The novel feature of the epoxy resin is the method of cross-linking. To facilitate processing, cross-linking is brought about in two stages. The first stage occurs at low temperature, of the order of 80° C., using an aliphatic amine type catalyst such as amino ethyl piperazine, which produces only partial cross-linking, resulting in a half-finished product. The final cross-linking is brought about at high temperature of the order of 180° by an aromatic diamine such as diamino diphenyl methyl resulting in the end product. The proportions of the catalysts are 0.1 to 0.8% by volume and 3 to 15% by volume, respectively.

Alternatively, a single aliphatic amine-type hardening agent can be used, e.g., a cyclo-aliphatic diamine, resulting in first cross-linking at 80° C. as before, followed by second or final cross-linking at 130° C. The result, via a vitreous transition, is a malleable state where shaping can be completed. In the following Table, the mechanical characteristics obtained with the component according to the invention are compared with the characteristics of a plastics component and a metal component having a similar cross-section.

| CHARACTERISTICS | CELLULOSE ACETATE | METAL | JP 60-095 422 | COMPOSITE ACCORDING TO THE INVENTION |
|---|---|---|---|---|
| Longitudinal Modulus E | 1 700 MPa | 180 000 MPa | 2–3 000 MPa | 147 000 MPa |
| Shearing Modulus G | — | 60 000 MPa | — | 17 000 MPa |
| Breaking stress under tension | 38 MPa | 800 MPa | 2000 MPa | 1 000 MPa |
| Elongation | 36.5% | 3 to 5% | | 0.6% |
| Density | 1.26 | 8.9 | | 1.56 |

As can be seen, the composite material according to the invention has all the mechanical advantages of metal, whereas its density is near that of plastics, and in all cases below 2. The advantage, including weight and mechanical properties, of rims constructed according to the invention is readily understood because half the weight of a spectacle frame is due to the weight of the two rims.

FIG. 3 shows the various stages in a method of manufacturing a rim according to the invention. Since some processes are similar to folding, it is strongly recommended that the hollow tubular braid should first be filled with an inert material (16 in FIG. 1) to avoid crushing. To this end, the braid can be woven around a cylindrical member made of flexible polyurethane foam or an elastomer such as an ethylene-propylene diene monomer or a member made from parallel juxtaposed polyester threads. These materials are capable of withstanding the temperature of the order of 130° to 180° C. necessary for the second cross-linking process without degradation. These components can be removed at the end of the process or can be left in position, since they neither influence the strength of the material nor damage it.

Figure 3A:
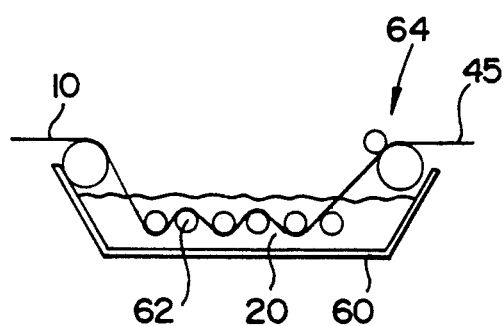
FIGS. 3a to 3c are diagrams of the various stages of a method of manufacture.

With reference to FIG. 3a, impregnation is brought about in a tank 60 at ambient temperature. The tubular braid is conveyed between staggered rollers 62 immersed in the resin 20. At the tank outlet, a drying device 64 removes surplus resin. The proportion by volume of resin to fibers will, of course, depend on the shape and the method of weaving the braid, which leaves limited space for the gaps for holding the resin.

The pre-impregnated braid 45 is then cut to the desired length of the rim. It is then disposed in a suitable tool 70 illustrated in FIG. 3b, which compresses the braid into a box shape. Of course, the outer periphery of the box shape, as seen in cross-section, can be rectangular or cylindrical or grooved, and/or the cross-section of the shape can vary slightly in the longitudinal direction of the braid, for aesthetic reasons. The braid is then heated at a pressure P1 of about 5 to 8 bars and at a temperature T1 of the order of 80° C. for about 10 to 25 minutes, depending on the nature of the hardening agent, to start a first partial cross-linking. After the tool 70 has cooled, a composite box-shaped rod or strand 48 is recovered and, if required, can be stored as a semi-finished product.

Figure 3B:
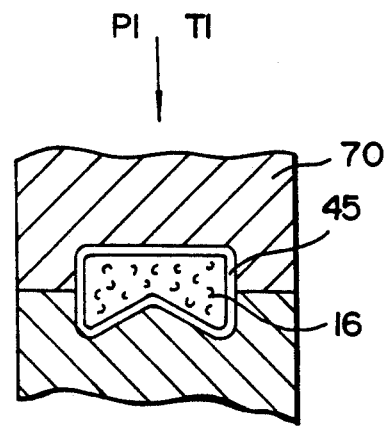
Figure 3C:
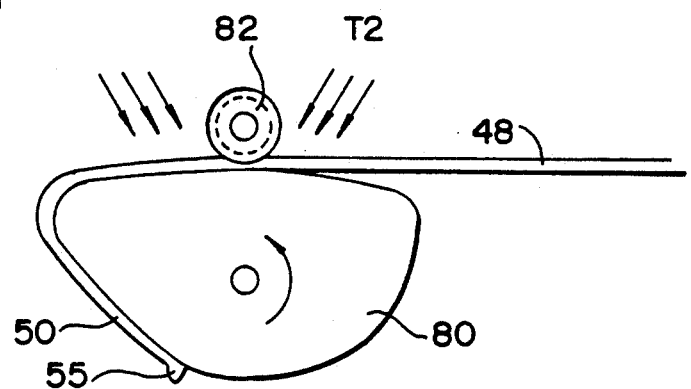

The composite rod 48 is then shaped as illustrated in FIG. 3c around a mandrel 80 having the shape of the desired rim. The rod is gripped between mandrel 80 and a serrated roller 82 and is simultaneously heated to a temperature T2 of the order of 130° or 180° C. for about 15 to 25 minutes, depending on the nature of the hardening agent, to start the final cross-linking of the composite. After cooling, the composite rim surrounding the mandrel is slightly moved in order to detach it. The relatively slight movement can be used both for detaching it from the mandrel and for subsequently inserting the lens into the rim. The duration of heating for cross-linking can be reduced to about 2 to 5 minutes by adding accelerators.

Before the final cross-linking, each end of the rod can be compressed to form an excess thickness 55 for subsequent use as a closure block, also called a rim clamp.

Other spectacle frame components namely, subsequent to solidification of said synthetic resin can be manufactured similarly, if the shape of the mould 70 in FIG. 3b is suitably modified. For example, a part of the frame can have a first flattened quarter whereas the rest has a round, square, polygonal or other cross-section, in which case only the flattened part will be folded.

To facilitate assembly, additional metal or organic components can be inserted into the intermediate composite rod 48, to form plates for securing other components such as a bridge, plate support or decorative part.

The assembly can be stuck in a completely reliable manner, provided the surfaces in contact have sufficient area and embedding shape. For example, a composite rim, can be stuck to a bridge made of polyamide plastics filled with carbon, using an epoxy adhesive such as that sold under the name AW 106 manufactured by Ciba or that sold under the name Agonet P208 manufactured by DEGUSSA. The resulting assembly has a shearing strength equivalent to brazed silver seams on metal frames, i.e., absence of tearing when subjected to a force of 500 newtons. These remarkable sticking properties can be improved by increasing the roughness of the surfaces, by adding glass micro-spheres to the resin or by sanding the surface.

Alternatively the ends of components made by injection of plastics can be molded on to the rim. Alternatively decorative components or the like can be crimped on to the solidified composite components.

In the case where the rim is decorated only, it is preferable to use polyepoxy paints, which have very considerable adhesion. The paints can then be used in the form of a electrostatic powder or a fluidised bed for applying a very thick layer when it is desired to mask the woven structure of the composite. Of course, special aesthetic effects can always be obtained by physical or chemical means.

In the case of a frame incorporating composite rims and thermoplastic components (e.g. polyamide 12), polyester-polyurethane fittings are preferred owing to their adhesive properties and because they polymerise at a temperature which is sufficiently low not to damage thermoplastics.

Alternatively other filaments of different colors, such as yellow Aramid filaments or tinted carbon filaments, can be initially mixed with the carbon monofilaments to obtain a tubular braid which is not black. Similarly, the tubular braid can be woven from threads of various colors, and thus become multi-colored. The resin itself may also be colored.

Numerous improvements can be made to tubular components of spectacle frames made of epoxy resin reinforced by a carbon braid, without departing from the invention.

We claim:

1. A spectacle frame component comprising fiber-reinforced, synthetic resin comprising a single tubular braid comprising a taffeta weaving stitch from long reinforcing fibers, said tubular braid comprising from 4 to 8 threads at an angle between 15 and 45 degrees to a longitudinal axis of the component.

2. The spectacle frame component according to claim 1, wherein the tubular braid is woven from threads made up of a number of long carbon monofilaments.

3. The spectacle frame component according to claim 2, wherein said long carbon monofilaments in each thread are parallel.

4. The spectacle frame component according to claim 1, comprising from between 40 to 50 percent resin by volume.

5. The spectacle frame component according to claim 1, wherein said synthetic resin comprises a bisphenol epoxy including 0.1 to 0.8 % by volume of a first aliphatic amine hardening agent and 3 to 50% by volume of a second aromatic diamine hardening agent.

6. The spectacle frame component according to claim 1, wherein said synthetic resin comprises a bisphenol epoxy including from 30 to 50% by volume of a single cyclo-aliphatic diamine hardening agent.

7. The spectacle frame component according to claim 1, wherein said tubular braid is woven from threads or monofilaments of different colors.

8. The spectacle frame component according to claim 1, wherein an additional component is attached by insertion into said tubular braid of the fiber-reinforced, synthetic resin.

9. The spectacle frame component according to claim 1, wherein an additional component is attached by an epoxy adhesive to the tubular braid subsequent to solidification of said synthetic resin.

10. The spectacle frame component according to claim 1, wherein an additional plastic component is molded onto the tubular braid subsequent to solidification of said synthetic resin.

11. A spectacle frame component comprising fiber-reinforced, synthetic resin comprising a single tubular braid is woven from long reinforcing fibers, said tubular braid having a diameter between 1 and 5 millimeters and a thickness of between 0.1 and 0.5 millimeters.

12. The spectacle frame component according to claim 11, wherein the tubular braid is woven from threads made up of a number of long carbon monofilaments.

13. The spectacle frame component according to claim 12, wherein said long carbon monofilaments in each thread are parallel.

14. The spectacle frame component according to claim 11, comprising from between 40 to 50 percent resin by volume.

15. The spectacle frame component according to claim 11, wherein said synthetic resin comprises a bisphenol epoxy including 0.1 to 0.8% by volume of a first aliphatic amine hardening agent and 3 to 50% by volume of a second aromatic diamine hardening agent.

16. The spectacle frame component according to claim 11, wherein said synthetic resin comprises a bisphenol epoxy including from 30 to 50% by volume of a single cyclo-aliphatic diamine hardening agent.

17. The spectacle frame component according to claim 11, wherein said tubular braid is woven from threads or monofilaments of different colors.

18. The spectacle frame component according to claim 11, wherein an additional component is attached by insertion into said tubular braid of the fiber-reinforced, synthetic resin.

19. The spectacle frame component according to claim 11, wherein an additional component is attached by an epoxy adhesive to the tubular braid subsequent to solidification of said synthetic resin.

20. The spectacle frame component according to claim 11, wherein an additional plastic component is molded onto the tubular braid subsequent to solidification of said synthetic resin.

* * * * *